: US006474825B1

United States Patent
Saito et al.

(10) Patent No.: US 6,474,825 B1
(45) Date of Patent: Nov. 5, 2002

(54) PLANAR LIGHT-EMITTING DISPLAY PANEL

(75) Inventors: Masashi Saito, Tokyo; Kiyoshi Sato, Saitama, both of (JP)

(73) Assignee: Ichiyo-sha Co., Ltd., Tokyo (JP)

( * ) Notice: Subject to any disclaimer, the term of this patent is extended or adjusted under 35 U.S.C. 154(b) by 0 days.

(21) Appl. No.: 09/679,529

(22) Filed: Oct. 6, 2000

(30) Foreign Application Priority Data

Oct. 15, 1999 (JP) .......................................... 11-293976

(51) Int. Cl.[7] .............................. F21V 7/04; F21V 3/00; F21V 5/00
(52) U.S. Cl. ............................. 362/31; 362/26; 362/27; 362/311; 362/268; 362/331; 362/330
(58) Field of Search ............................. 362/26, 31, 27, 362/268, 331, 330, 311; 353/120; 40/546, 547

(56) References Cited

U.S. PATENT DOCUMENTS

| | | | | |
|---|---|---|---|---|
| 5,138,783 A | * | 8/1992 | Forsse | 40/546 |
| 5,151,679 A | * | 9/1992 | Dimmick | 340/326 |
| 5,283,673 A | | 2/1994 | Murase et al. | |
| 5,365,411 A | * | 11/1994 | Rycroft et al. | 362/20 |
| 5,410,454 A | * | 4/1995 | Murase et al. | 362/31 |
| 5,546,687 A | * | 8/1996 | Iorfida | 40/546 |
| 5,625,968 A | * | 5/1997 | Ashall | 40/546 |
| 5,949,505 A | | 9/1999 | Funamoto et al. | |
| 5,957,561 A | * | 9/1999 | Ono et al. | 362/31 |
| 6,055,029 A | * | 4/2000 | Kurihara et al. | 349/65 |
| 6,108,060 A | * | 8/2000 | Funamoto et al. | 349/65 |
| 6,123,430 A | * | 9/2000 | Ono et al. | 362/31 |
| 6,308,444 B1 | * | 10/2001 | Ki | 40/546 |

FOREIGN PATENT DOCUMENTS

| | | |
|---|---|---|
| EP | 0341817 | 11/1989 |
| EP | 0802446 | 10/1997 |
| FR | 2678758 | 1/1993 |
| GB | 2238377 A | 5/1991 |

OTHER PUBLICATIONS

Japanese Patent Application 3–118594, No English language Abstract included, however, UK Pat. Publication is enclosed.

* cited by examiner

Primary Examiner—Thomas M. Sember
Assistant Examiner—Jacob Y. Choi
(74) Attorney, Agent, or Firm—Dennison, Schultz & Dougherty

(57) ABSTRACT

Disclosed is a planar light-emitting display panel device of the edge-lighting type used for demonstration of an image of painting, photograph or commercial product for the purpose of decoration or advertisement, in which the image-bearing transparency can be easily replaced with another. The device comprises, as an assembly: (a) a rectangular planar light emitter having a rectangular light-conductive board; (b) at least one elongated light source held in contact with one of the edge surfaces of the light-conductive board; (c) a rectangular frame consisting of four frame branches, three of which are rigidly connected together to hold the planar light emitter and the elongated light source therein and the fourth of which is demountable, each having an inversely L-shaped cross section consisting of a top flat and a side flat so as to define a grooved space by the lower surface of the top flat and the upper surface of the planar light emitter; (d) an image-bearing transparency; and (e) a folder consisting of two flaps made from a transparent plastic sheet, in which the image-bearing transparency is held by the folder between the two flaps and the transparency-holding folder is inserted into the grooved spaces in a withdrawable fashion.

12 Claims, 4 Drawing Sheets

PLANAR LIGHT-EMITTING DISPLAY PANEL

BACKGROUND OF THE INVENTION

The present invention relates to a planar light-emitting display panel device or, more particularly, to a planar light-emitting framed display panel device belonging to the so-called edge-lighting system in which an image borne on a transparency such as landscapes, portraits, commercial goods and the like is illuminated from behind on a planar light-emitting board so that the image is imparted with clear conspicuousness with ready replaceability of the image-bearing transparency enabling exhibition of a variety of images to meet the requirements of the occasions and places.

It is very conventional from old that panels of paintings or photographs either unframed or framed are used for the purpose of room decoration and commercial advertisement. The most traditional way to make the images of paintings or photographs conspicuous to the viewers is limited to illumination of the painting or photograph by projecting light to the surface of the painting or photograph to increase the luminosity of the surface despite the limited effectiveness of the method.

Alternatively, backlight-illuminated display panels are also known mainly for the purpose of commercial advertisement in which an image-bearing transparency is illuminated by light from behind so that the image borne on the transparency is made conspicuous. Since the light source used in the display panels of this type is limited to an assembly of a plurality of linear light sources such as fluorescent lamps, however, the surface luminosity of the display panel cannot be very uniform over the whole surface, display panels of this type are not always quite satisfactory when a high aesthetic effect is desired as in the appreciation of fine art masterpieces of landscapes, portraits and the like.

On the other hand, a planar light-emitting display system to serve as a backlight for liquid crystal panels by the so-called edge-lighting system, which ensures uniformity of luminosity over the whole surface, has made its debut as a result of recent development works. An attempt is also made for the utilization of the same as a planar light source for illumination of an image-bearing transparency from behind.

The above mentioned planar light-emitting system of the edge-lighting type is disclosed in Japanese Patent Kokai 3-118594 and U.S. Pat. No. 5,283,673, according to which a light-conductive board made from a transparent material is illuminated at one or opposite two of the edge surfaces each by projecting light from a linear light source such as an elongated fluorescent lamp to make planar light emission by means of the light transmitting the light-conductive board from one of the flat surfaces. The luminosity of the surface naturally decreases from the surface of the light incidence to the position remote therefrom so that the luminosity of the surface cannot be uniform enough. This problem of non-uniformity of the surface luminosity is compensated for by providing an irregular-reflection or light-scattering layer having a gradation on one of the surfaces of the light-conductive board by the method of special printing or embossing.

In the prior art backlight illumination unit of images utilizing the planar light-emitting system of the edge-lighting type, however, a specific image and a light-emitter are in a fixedly conjoined structure so that a picture scene of the image can be changed to a different one only by replacing the unit as a whole with a great inconvenience.

SUMMARY OF THE INVENTION

The present invention has an object, in view of the above described disadvantages and inconveniences in the prior art, to provide a planar light-emitting display panel device of the edge-lighting type in which a transparency bearing an image of landscape, portrait and the like is uniformly illuminated from behind so as to clearly make the image conspicuous without decreasing the aesthetic value of the image along with ready replaceability of the image-bearing transparency at any time as desired.

Thus, the present invention provides a planar light-emitting display panel device of the edge-lighting type which comprises, as an assembly:

- a planar light emitter (6) comprising a light-conductive board (1);
- at least one elongated light source (7) which is in contact with or in the vicinity of one of the edge surfaces of the light-conductive board (1);
- a transparency sheet (15) bearing an image as mounted on the planar light emitter; and
- a rectangular frame (11) consisting of four frame branches having an inversely L-shaped cross section fixedly holding the planar light emitter (6) and the image-bearing transparency sheet (15) at three frame branches (8, 9, 10), the rest of the frame branches (11) being openable and closable, in which engagement grooves (12, 13, 14) are defined by the lower surface of the top flat of each of the three frame branches (8, 9, 10) and the upper surface of the planar light emitter (6), the elongated light source (7) is located in the space between one of the frame branches and the edge surface of the light-conductive board (1) and the image-bearing transparency sheet (15) is, either as such or as being held by a folder made of a transparent plastic sheet (16), inserted into the engagement grooves (12, 13, 14) in a freely withdrawable fashion.

DETAILED DESCRIPTION OF THE PREFERRED EMBODIMENTS

In the following, the inventive device is described in more detail by making reference to the accompanying drawings.

Figure 1:
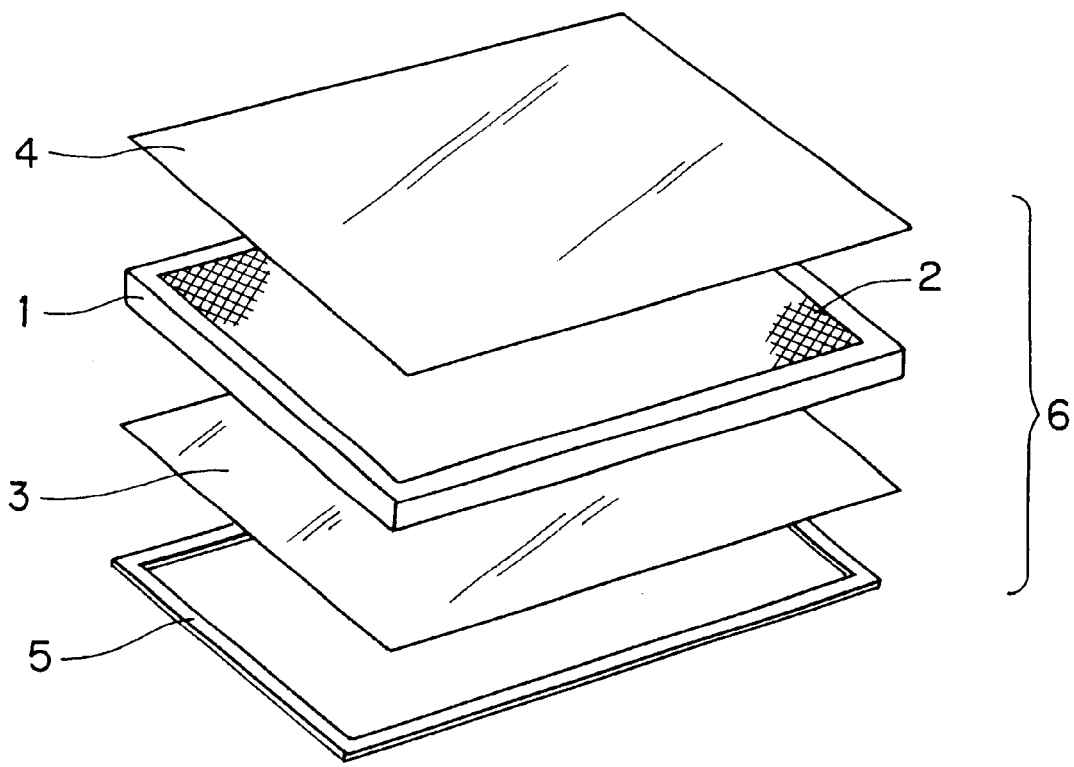
FIG. 1 is a perspective view of a planar light emitter as disassembled into parts.
Figure 2:
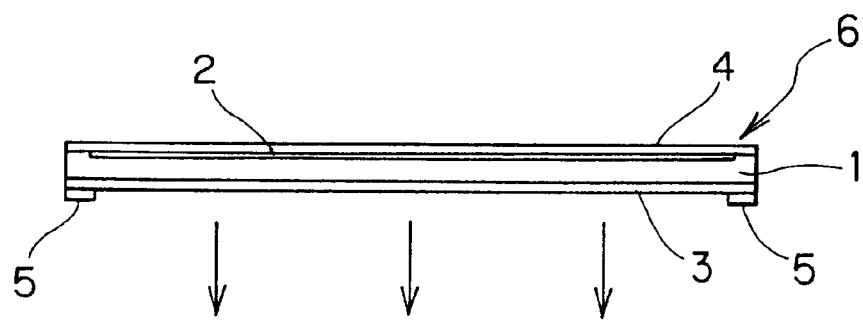
FIG. 2 is a vertical cross sectional view of the planar light emitter illustrated in FIG. 1.

FIG. 1 illustrates an example of the planar light emitter 6 used in the inventive device as disassembled into parts by a perspective view. FIG. 2 is a vertical cross sectional view of the same planar light emitter 6 as assembled. This planar light emitter 6 has a layered structure consisting of a light-conductive board 1, a light-diffusion sheet 3 laminated on one surface of the light-conductive board 1 and a reflection sheet 4 laminated on the other surface of the light-conductive board 1. The surface of the light-conductive board 1 in contact with the reflection sheet 4 is shaped in the form of an irregular-reflection or light-scattering surface 2 formed by the method of special printing or embossing. Lamination of the light-conductive board 1 with the light-diffusion sheet 3 and the reflection sheet 4 can be performed by several different methods including bonding with an adhesive, high-frequency welding, mechanical press bonding and so on.

The light-conductive board 1 is made from a plastic resin having good transparency such as polyethylene, polypropylene, polyvinyl chloride, acrylic resins and the like, of which acrylic resins such as polymethyl methacrylate and copolymers of methyl methacrylate and methacrylic acid are preferred in respect of their high transparency to visible light. The light-conductive board 1 has a thickness in the range, usually, from 2 to 20 mm or, preferably, from 5 to 10 mm. The light-conductive board 1 is provided on one surface with a dot pattern with gradated density by the method of printing or embossing to serve as an irregular-reflection surface 2. Gradation of the dot pattern is made in such a fashion as to ensure uniformity of the surface luminosity of the board 1 when the board 1 is illuminated with a linear light source on one or opposite two of the edge surfaces.

The reflection sheet 4 laminated onto the irregular-reflection surface 2 serves to reflect the light transmitted through the light-conductive board 1 toward the direction perpendicular to the surface of the board 1. The reflection sheet 4 is made from a transparent plastic resin such as a polyester resin, polycarbonate resin, acrylic resin and the like and has a thickness in the range, usually, from 50 to 250 $\mu$m or, preferably, from 75 to 200 $\mu$m.

The light-diffusion sheet 3, which is laminated onto the light-conductive board 1 on the surface opposite to the reflection sheet 4, serves to scatter the light transmitted by the light-conductive board 1 and reflected by the reflection sheet 4 toward the direction perpendicular to the surface of the light-conductive board 1. The light-diffusion sheet 3 is made also from a transparent plastic resin such as a polyester resin, polycarbonate resin, acrylic resin and the like and has a thickness in the range, usually, from 50 to 350 $\mu$m or, preferably, from 100 to 200 $\mu$m.

When the planar light emitter 6 is brought under the conditions for light emission, the luminosity of the image-bearing transparency cannot be fully uniform over the whole surface due to leakage of the illuminating light out of the peripheral areas of the board 1. This problem can be solved at least partly by disposing a light-absorbing frame 5 to mask the peripheral areas of the light-conductive board 1 as is illustrated in FIGS. 1 and 2. This light-absorbing frame 5 can be formed by printing on the peripheral areas of the reflection sheet 3 with a gray or black ink or alternatively by putting a gray- or black-colored rectangular framework separately prepared onto the reflection sheet 3.

Figure 3A:
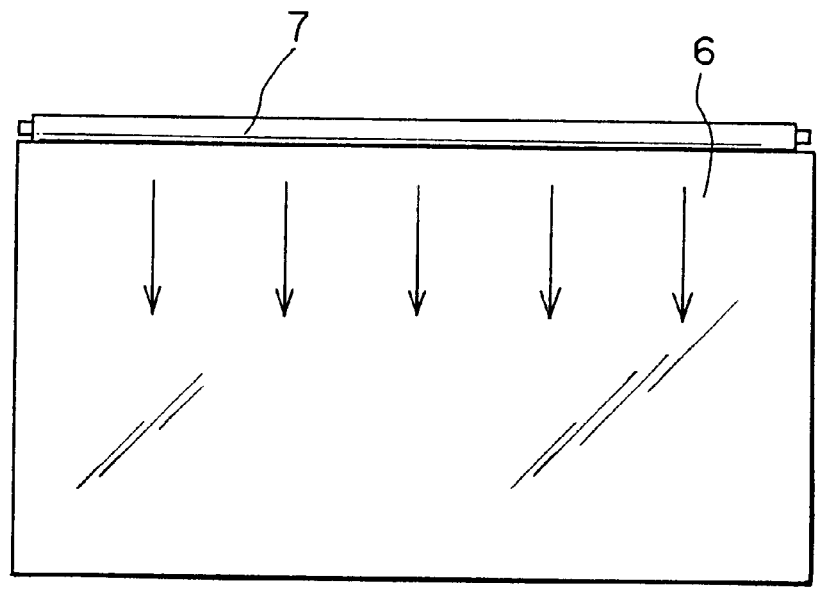
FIG. 3A is a plan view of the planar light emitter of which a light-conductive board is illuminated on one edge surface with an elongated light source.
Figure 3B:
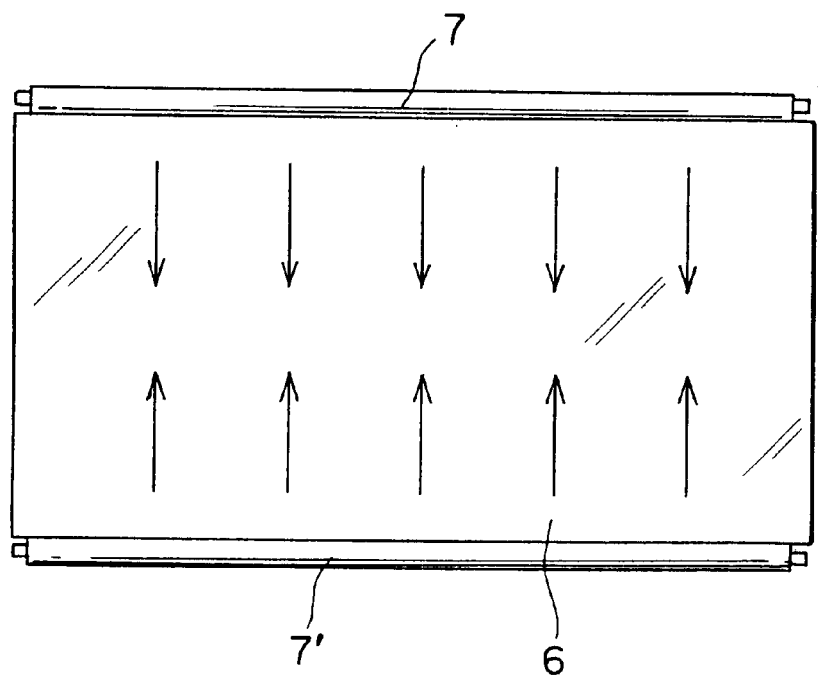
FIG. 3B is a plan view of the planar light emitter of which a light-conductive board is illuminated on two opposite edge surfaces each with an elongated light source.

The planar light emitter 6 used in the present invention is constructed of the light-conductive board laminate described above and one or two of elongated light sources 7,7' such as a straight-tube fluorescent lamp at one or opposite two of the edge surfaces. FIGS. 3A and 3B are each a plan view of such an assembly with a single elongated light source 7 and with two elongated light sources 7,7', respectively. The downwardly directed arrows and the upwardly directed arrows in these figures indicate the light emitted from the respective light sources 7,7', respectively, and transmitted through the light-conductive board of the planar light emitter 6.

Figure 4:
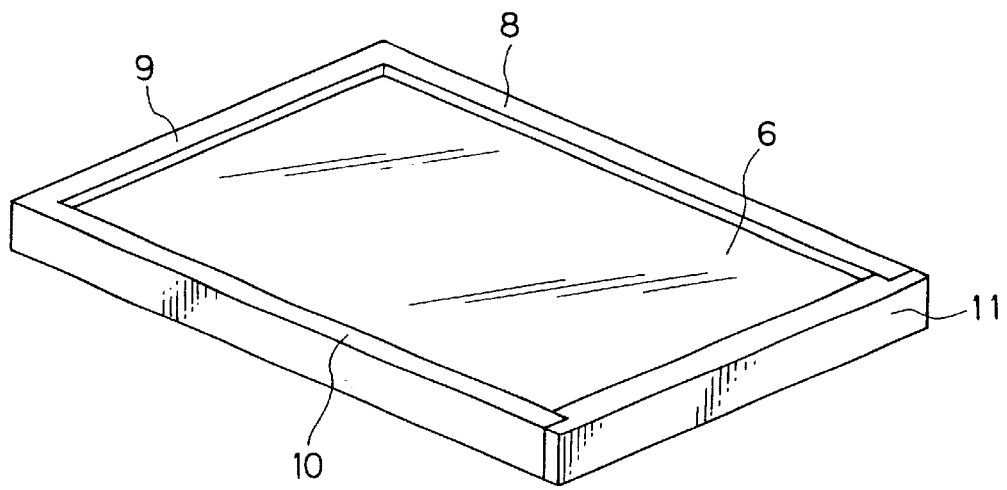
FIG. 4 is a perspective view of the framed planar light-emitting display panel device according to the invention.

FIG. 4 is a perspective view of the planar light-emitting display panel device of the invention consisting of the planar light emitter 6 constructed as described above, two elongated light sources (not appearing in the figure) and a frame fixedly holding the planar light emitter 6 at the three frame branches 8, 9, 10 facing the three edge surfaces of the planar light emitter 6, respectively, and a disassemblable fourth frame branch 11 facing the fourth edge surface of the planar light emitter 6.

In this assembly, each of the frame branches 8, 9, 10 is firmly engaged with the planar light emitter 6 or adhesively bonded thereto. The fourth frame branch 11 is connected to the frame branches 8, 10 in a freely disassemblable and assemblable fashion by means of a simple structure for engagement or freely openable and closable fashion up and down or right and left by means of a hinge member and the like.

Figure 5:
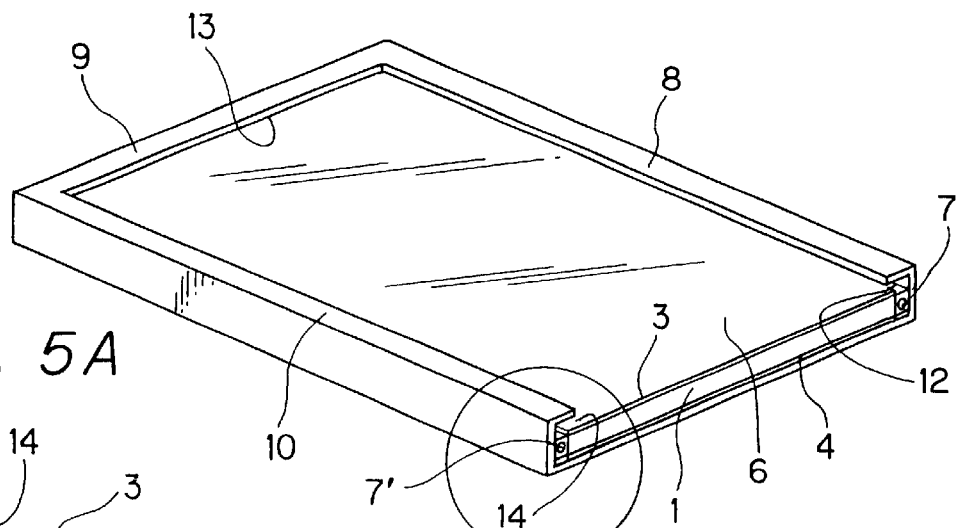
FIG. 5 is a perspective view of the planar light-emitting display panel device according to the invention framed but without mounting the fourth frame branch so as to expose an edge surface of the planar light emitter.
Figure 5A:
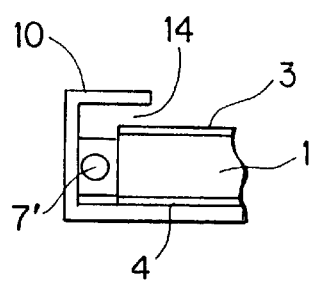
FIG. 5A is a partial enlargement of FIG. 5.

FIG. 5 is a perspective view of the same assembly as above with the disassemblable frame branch 11 demounted to expose one of the edge surfaces of the planar light emitter 6 as well as the end portions of the elongated light sources 7,7' each held in the space between the inner surface of the frame branch and the edge surface of the light-conductive board 1. Grooves 12, 14 in this figure are defined each by the upper surface of the planar light emitter 6 and the lower surface of the top flat of the respective frame branches 8, 10, respectively. A similar groove 13 is defined also by the upper surface of the planar light emitter 6 and the lower surface of the top flat of the frame branch 9. These grooves 12, 13, 14 serve to receive an image-bearing transparent sheet 15 held in a folder 16 described later.

Though dependent on the size of the folder 16 holding an image-bearing transparent sheet 15, the engagement grooves 12, 13, 14 have a width of 0.5 to 2 mm and a depth of 2 to 5 mm in order to facilitate insertion of the folder 16 into and withdrawal of the same out of the grooves.

Figure 6:
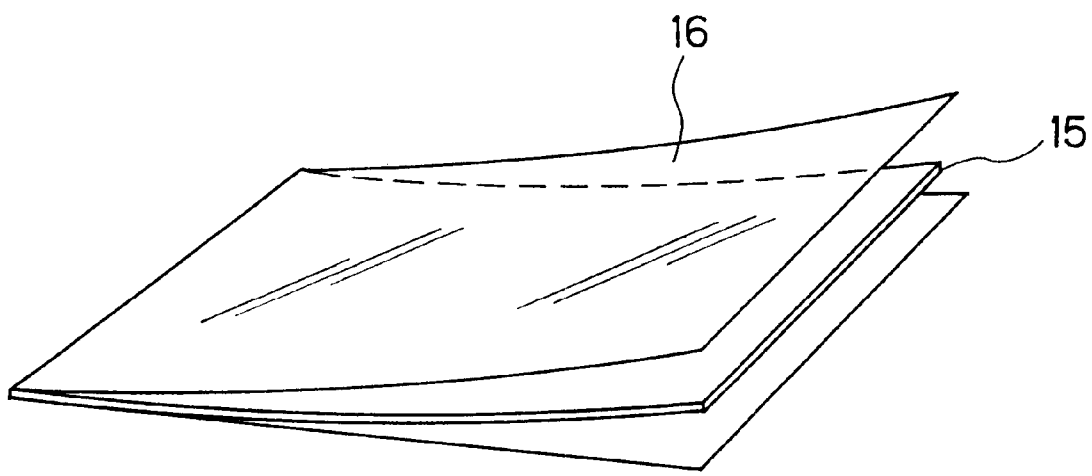
FIG. 6 is a perspective view of the transparency folder made of a transparent sheet holding an image-bearing transparency sheet.

FIG. 6 is a perspective view of a transparency folder 16 holding a transparency 15 bearing an image of a painting or photograph sandwiched between the two flaps of the folder 16. The folder 16 is made of a sheet of a transparent plastic resin such as polyethylene, polypropylene, polyester, polycarbonate, polyvinyl chloride and the like. The folder 16 is prepared preferably by two-fold bending of a single rectangular plastic sheet along a line across the sheet in the direction of the shorter or longer side thereof. Alternatively, the folder 16 can be prepared from two rectangular plastic sheets which are bonded together along one side or two sides. Further alternatively, the folder 16 can be prepared by bending three side areas toward the same inward direction to form a holding pocket with the three bent flaps, the rest of the four side portions being unbent to serve as the insertion mouth of the pocket.

It is an optional design of the transparency folder 16, if desired, that an additional transparent covering sheet is provided on the surface of the folder 16. An antistatic protective sheet can also be provided thereon. It is preferable, however, when an antistatic effect is important in the folder 16 that the folder per se is made of a plastic sheet rendered antistatic by compounding the resin composition with an antistatic agent. A variety of known antistatic agents can be employed for the purpose including cationic surface active agents such as quaternary ammonium compounds and pyridine derivatives, anionic surface active agents such as olefin sulfate esters and alkylbenzenesulfonate esters, non-ionic surface active agents such as partial fatty acid esters of polyhydric alcohols and ethyleneoxide adducts of aliphatic alcohols and fatty acid esters and amphoteric surface active agents such as betaine carboxylic acid derivatives and imidazoline derivatives. The means for obtaining an anti-static effect of the folder 16 is not limited to the use of an antistatic agent but the effect can be accomplished by bringing the folder 16 into contact with a grounded electro-conductive body, by irradiating the folder 16 with ultraviolet light or X-rays or by making the additional transparent covering sheet or the folder 16 per se from a plastic resin having electric conductivity.

In the planar light-emitting display panel device of the present invention, it is preferable that an ultraviolet-absorbing layer having a thickness of 0.05 to 0.2 mm is formed on the surface of the planar light emitter 6 or the transparency folder 16 or on both by coating the surface with a coating composition containing an ultraviolet-absorbing agent followed by drying. When the planar light emitter is provided with such an ultraviolet-absorbing layer, the layer is formed preferably on the irregular-reflecting surface 2 of the light-conductive board 1. When the transparency folder 16 is provided with the ultraviolet absorbing layer, the layer is formed on the upper surface of the transparent plastic sheet forming the folder 16.

Various kinds of ultraviolet absorbing agents known in the prior art can be used for this purpose including benzophe-none compounds, salicylate compounds, benzotriazole com-pounds and acrylonitrile-based or metal complex-based polymeric compounds, of which fluorine-containing ones are particularly preferable.

What is claimed is:

1. A planar light-emitting display panel device of the edge-lighting type which comprises, as an assembly:

(a) a rectangular planar light emitter having a rectangular light-conductive board;

(b) at least one elongated light source held in contact with one of the edge surfaces of the light-conductive board;

(c) a rectangular frame consisting of four frame branches, three of which are rigidly connected together to hold the planar light emitter and the elongated light source therein and the fourth of which is demountable, each having an inversely L-shaped cross section consisting of a top flat and a side flat so as to define a grooved space by the lower surface of the top flat and the upper surface of the planar light emitter; and (d) an image-bearing transparency, in which the image-bearing transparency is inserted into the grooved spaces in a withdrawable fashion.

2. The planar light-emitting display panel device as claimed in claim 1 in which the planar light emitter is an integrally layered body consisting of the light-conductive board, of which one of the surfaces is made a light-scattering surface, a reflection sheet laminated onto the irregular-reflecting surface of the light-conductive board and a light-diffusion sheet laminated onto the surface of the light-conductive board opposite to the light-scattering surface.

3. The planar light-emitting display panel device as claimed in claim 2 in which the light-conductive board is made from a transparent plastic resin.

4. The planar light-emitting display panel device as claimed in claim 2 in which the light-conductive board has a thickness in the range from 2 to 20 mm.

5. The planar light-emitting display panel device as claimed in claim 2 in which the reflection sheet is made from a transparent plastic resin.

6. The planar light-emitting display panel device as claimed in claim 2 in which the reflection sheet has a thickness in the range from 50 to 250 $\mu$m.

7. The planar light-emitting display panel device as claimed in claim 2 in which the light-diffusion sheet is made from a transparent plastic resin.

8. The planar light-emitting display panel device as claimed in claim 2 in which the light-diffusion sheet has a thickness in the range from 50 to 350 $\mu$m.

9. The planar light-emitting display panel device as claimed in claim 1 which comprises two elongated light sources each held in contact with one of two opposite edge surfaces of the rectangular light-conductive board.

10. The planar light-emitting display panel device as claimed in claim 1 in which the elongated light source is a straight tubular fluorescent lamp.

11. The planar light-emitting display panel device as claimed in claim 1 in which the grooved space has a width in the range from 0.5 to 2 mm.

12. The planar light-emitting display panel device as claimed in claim 1 in which the image-bearing transparency is held by a folder consisting of two flaps made from a transparent plastic sheet and inserted into the grooved spaces as being sandwiched between the two flaps of the folder.

* * * * *